United States Patent
Cariou et al.

(10) Patent No.: US 9,924,458 B2
(45) Date of Patent: Mar. 20, 2018

(54) DYNAMIC RESOURCE BLOCK IDENTIFICATION FOR POWER SAVE POLLING IN A HIGH EFFICIENCY WIRELESS LOCAL-AREA NETWORK

(71) Applicant: Intel IP Corporation, Santa Clara, CA (US)

(72) Inventors: Laurent Cariou, Portland, OR (US); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 138 days.

(21) Appl. No.: 14/969,189

(22) Filed: Dec. 15, 2015

(65) Prior Publication Data
US 2017/0171810 A1 Jun. 15, 2017

(51) Int. Cl.
*H04W 52/02* (2009.01)
*H04W 72/04* (2009.01)
*H04W 84/12* (2009.01)

(52) U.S. Cl.
CPC ... *H04W 52/0206* (2013.01); *H04W 52/0216* (2013.01); *H04W 72/048* (2013.01); *H04W 84/12* (2013.01)

(58) Field of Classification Search
CPC ............ H04W 52/02; H04W 52/0206; H04W 52/0216; H04W 72/04; H04W 72/044; H04W 72/048; H04W 74/004; H04W 84/12; H04L 5/00; H04B 7/0452
See application file for complete search history.

(56) References Cited

U.S. PATENT DOCUMENTS

| | | | | |
|---|---|---|---|---|
| 2013/0272137 A1* | 10/2013 | Kwon | ................ | H04W 72/042 370/241 |
| 2014/0092797 A1* | 4/2014 | Chu | ................ | H04W 52/0216 370/311 |
| 2015/0173015 A1* | 6/2015 | Lee | ................ | H04W 52/0216 370/311 |
| 2016/0309508 A1* | 10/2016 | Li | ................ | H04W 74/006 |
| 2017/0013607 A1* | 1/2017 | Cariou | ................ | H04W 74/004 |
| 2017/0064684 A1* | 3/2017 | Cariou | ................ | H04W 72/044 |
| 2017/0070930 A1* | 3/2017 | Cariou | ................ | H04B 7/0452 |
| 2017/0273019 A1* | 9/2017 | Park | ................ | H04W 52/0209 |

* cited by examiner

*Primary Examiner* — Tri H Phan
(74) *Attorney, Agent, or Firm* — Schwegman Lundberg & Woessner, P.A.

(57) ABSTRACT

Apparatuses, computer readable media, and methods for dynamic resource block identification for power save polling in a high efficiency wireless local-area network are disclosed. A wireless apparatus comprising a memory and processing circuitry is disclosed. The processing circuitry is configured to encode a packet comprising a plurality of bits one bit for each association identification (AID) of a plurality of AIDs. A bit is set if the wireless apparatus is to poll a station with a corresponding AID. Each set bit indicates a resource block identification. The processing circuitry is further configured to encode a power save (PS) poll trigger to be transmitted to the stations. The processing circuitry is further configured to decode responses to the PS poll trigger from the stations, where the responses are to be received from the stations in accordance with the corresponding resource block identification.

25 Claims, 6 Drawing Sheets

DYNAMIC RESOURCE BLOCK IDENTIFICATION FOR POWER SAVE POLLING IN A HIGH EFFICIENCY WIRELESS LOCAL-AREA NETWORK

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ay and/or 802.11ax. Some embodiments relate to dynamic allocation of resource block identification (RBID) resource allocations or assignments. Some embodiments relate to RBID assignments for power save (PS) feedback. Some embodiments relate to RBID assignments dynamically made before a PS poll frame is sent using a traffic indication map (TIM).

BACKGROUND

The Internet of Things (IoT) is enabling many wireless devices to be deployed in wireless local-area network (WLAN). However, the IoT wireless devices are often battery constrained and yet need to communicate with central devices to download and upload data. Additionally, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
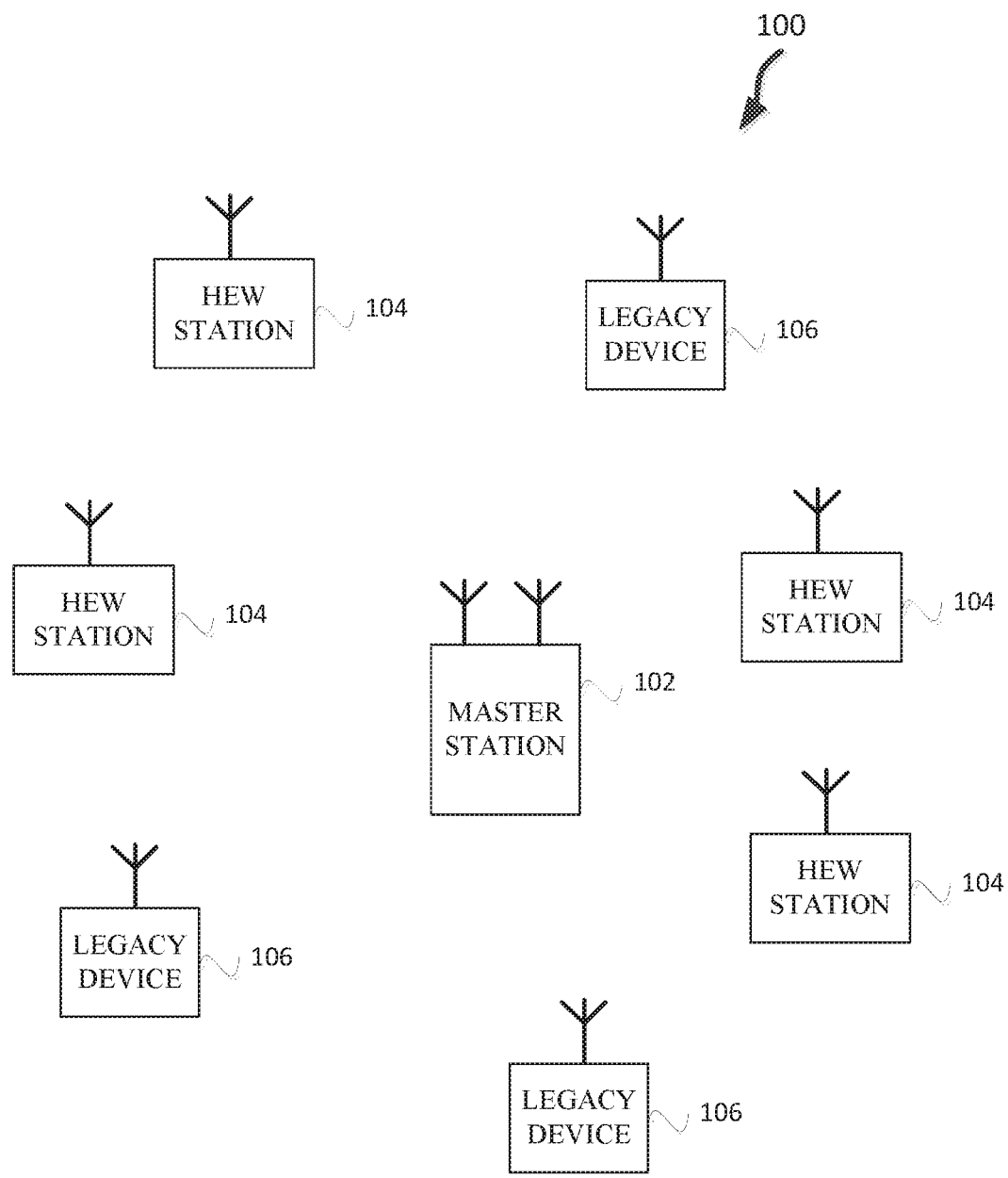
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-7.

Figure 2:
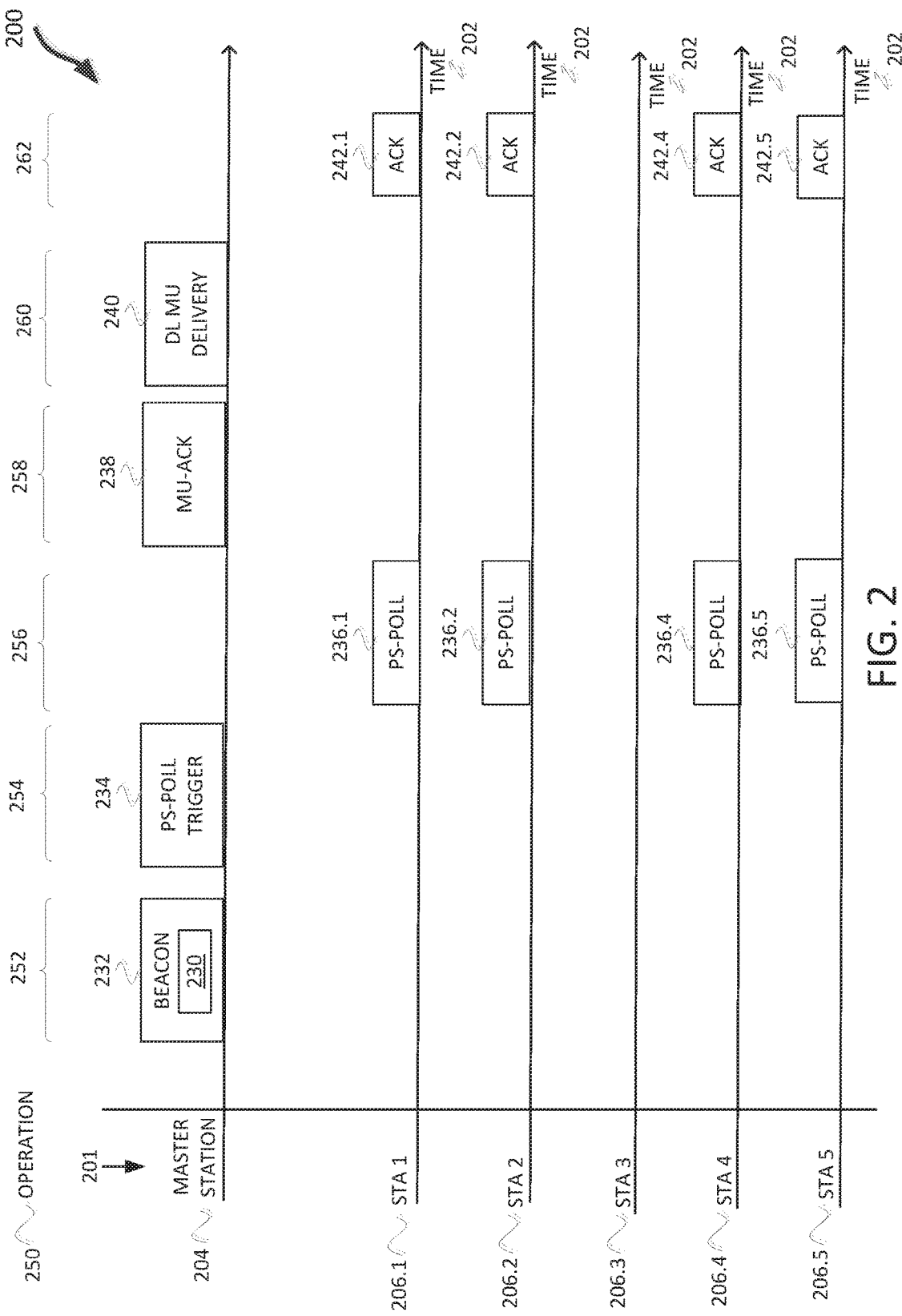
FIG. 2 illustrates a method for multi-user power save (MU-PS) polling in accordance with some embodiments.
Figure 3:
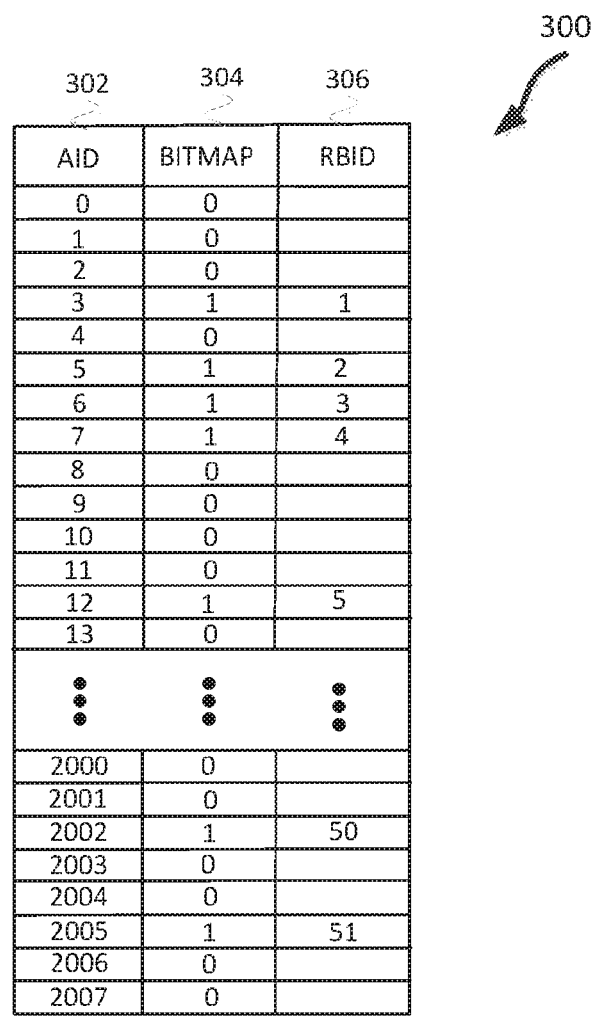
FIG. 3 illustrates a table that illustrates the relationship among an association identification (AID), a bitmap 304, and a RBID, in accordance with some embodiments.
Figure 4:
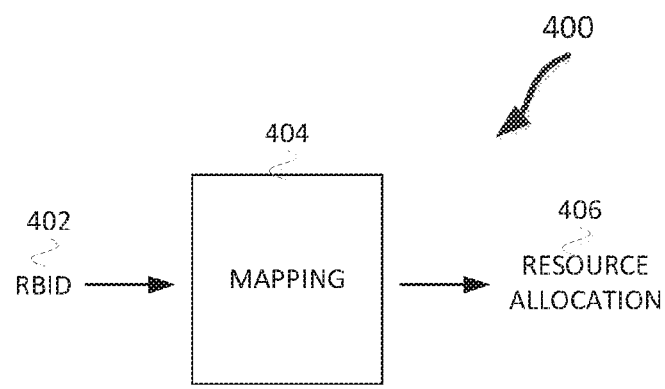
FIG. 4 illustrates a mapping between an R&D and a resource allocation.

FIGS. 2, 3, and 4 will be described in conjunction with one another. FIG. 2 illustrates a method 200 for multi-user power save (MU-PS) polling in accordance with some embodiments. FIG. 3 illustrates a table that illustrates the relationship among an association identification (AID) 302, a bitmap 304, and a RBID 306, in accordance with some embodiments. FIG. 4 illustrates a mapping 404 between an RBID 402 and a resource allocation 406.

Illustrated in FIG. 2 is the transmitter 201 along the vertical axis, time 202 along the horizontal axis, and the operation 250 along the top. The master station 204 may be a master station 102. The STAs 206 may be HEW stations 104.

The method 200 begins at operation 252 with a master station 104 transmitting a beacon frame 232. The beacon 232 may be received by one or more of the STAs 206. The beacon frame 232 includes a TIM 230. In some embodiments, the TIM 230 is transmitted in a different frame. For example, the TIM 230 may be transmitted in a trigger frame or another management frame. The TIM 230 may be as described in conjunction with FIG. 4. The STAs 206 use the TIM 230 to determine an RBID to use to respond to a PS-Poll trigger 234.

For example, illustrated in FIG. 3 is a table illustrating the relationships among an AID 302, a bitmap 304, and an RBID 306. The AID 302 is assigned to the STA 206 when the STA 206 associates with a master station 204. The bitmap 304 is included in the TIM 230. There may be a bit for each possible AID 302. The bit indicates whether or not the STA 206 has data buffered at the master station 204. If the STA 206 does have data buffered at the master station 204, then the bit of the bitmap 304 is set for the AID 302 corresponding to the STA 206, and the STA 206 is allocated an RBID 306. In some embodiments, there may be more STAs 206 associated with the master station 102 than there are RBIDs 306 so that not every STA 206 that is associated with the master station 102 is allocated an RBID 306. In some embodiments, there may be more STAs 206 associated with the master station 102 than there are RBIDs 306 so the RBIDs 306 may be grouped.

The STAs 206 determine their respective RBID 306 based on a position of their bit indicating they have an RBID 306. For example, as illustrated in FIG. 3, the STA 206 determines that their RBID 306 is the number of set bits (e.g., 1) in bitmap 304. For example, the STA 2 206.2 may be assigned AID 302 equal to 6. STA 2 206.2 receives the TIM 230 in beacon 232. The TIM 230 includes bitmap 304. The STA 2 206.2 counts the number of 1's up to AID 302 equal to 6 to determine that the RBID 306 for STA 2 206.2 is equal to 3. The RBID 306 is then used to determine a physical resource allocation 406 for STA 2 206.2. For example, mapping 404 (FIG. 4) may be used. FIG. 4 illustrates a mapping 404 that takes an RBID 402 (e.g., RBID 306) and maps the RBID 402 to a resource allocation 406. The resource allocation 406 is an indication of a subchannel and, optionally, a spatial stream for the STA 206 to use. The resource allocation 406 may indicate a duration, in accordance with some embodiments. For example, the resource allocation 406 may indicate a 20 MHz subchannel and a first spatial stream. The spatial stream may be determined by a P-matrix in accordance with some embodiments. In some embodiments the resource allocation 406 may be a different bandwidth, e.g. 2 MHz, 4 MHz, 40 MHz, 80 MHz., etc.

The method 200 continues at operation 254 with the master station 204 transmitting a PS-Poll trigger 234. The PS-Poll trigger 234 may be a management frame. For example, the PS-poll trigger 234 may indicate to the STAs 206 that the STAs 206 are to respond with an indication if they the master station 204 to allocation resources for the STA 206 in an uplink (UL) or downlink (DL) transmission opportunity.

The method 200 continues at operation 256 with the STAs 206s transmitting a PS-Poll 236 in accordance with the resource allocation 406 indicated in the TIM 230. Some STAs 206 may not respond based on a condition. For example, if the STA 206 is not requesting the data be sent to the STA 206, if the STA 206 did not receive the beacon 232, or if the master station 204 did not allocate a resource allocation 406 to the STA 206. For example, STA 1 206.1 may transmit the PS-poll 236.1 on a first 20 MHz subchannel on a first spatial stream; STA 2 206.2 may transmit the PS-Poll 236.2 on a second 20 MHz subchannel on a first spatial stream; STA 4 206.4 may transmit on a third 20 MHz subchannel on a first spatial stream; and, STA 5 206.5 may transmit on a fourth 20 MHz subchannel on a first spatial stream. See FIG. 6 for an example of stations transmitting PS-Poll 236.

If there were more STAs 206, the master station 204 may use multiple spatial streams and/or additional subchannels. If there were more RBIDs 306 than resource allocations 406, then the RBIDs 306 may be grouped according to some maximum number of RBIDs 306. The STAs 206 transmit the PS-POLL 236 in a time slot according to which group is indicated by the RBID 306 for the STA 206. So, for example, if there were only two RBIDs 306 then STA 1 206.1 and STA 2 206.2 may transmit PS-Poll 236.1 and PS-Poll 236.2, respectively, and then after STA 1 206.1 and STA 2 206.2 are finished transmitting STA 4 206.4 and STA 5 206.5 transmit PS-Poll 236.4 and PS-Poll 236.5, respectively.

The method 200 continues at operation 238 with the master station 204 transmitting a multi-user acknowledgment (MU-ACK) 238. The MU-ACK 238 may include an indication of each of the PS-Poll 236. The method 200 continues at operation 260 with the master station 204 transmitting a DL MU delivery 240. For example, the master station 204 may transmit data to the STAs 206 in accordance with a second resource allocation that may be indicated in the DL MU deliver 240.

The method 200 continues at operation 262 with the STAs 206 transmitting ACKs 242 to the master station 204. The STAs 206 may transmit the ACKs 242 in accordance with another resource allocation that may be the same as the second resource allocation or a different resource allocation (e.g., the DL MU delivery 240 may indicate a resource allocation for the STAs 206 to use to transmit the ACKs 242.) The method 200 may end.

Figure 5:
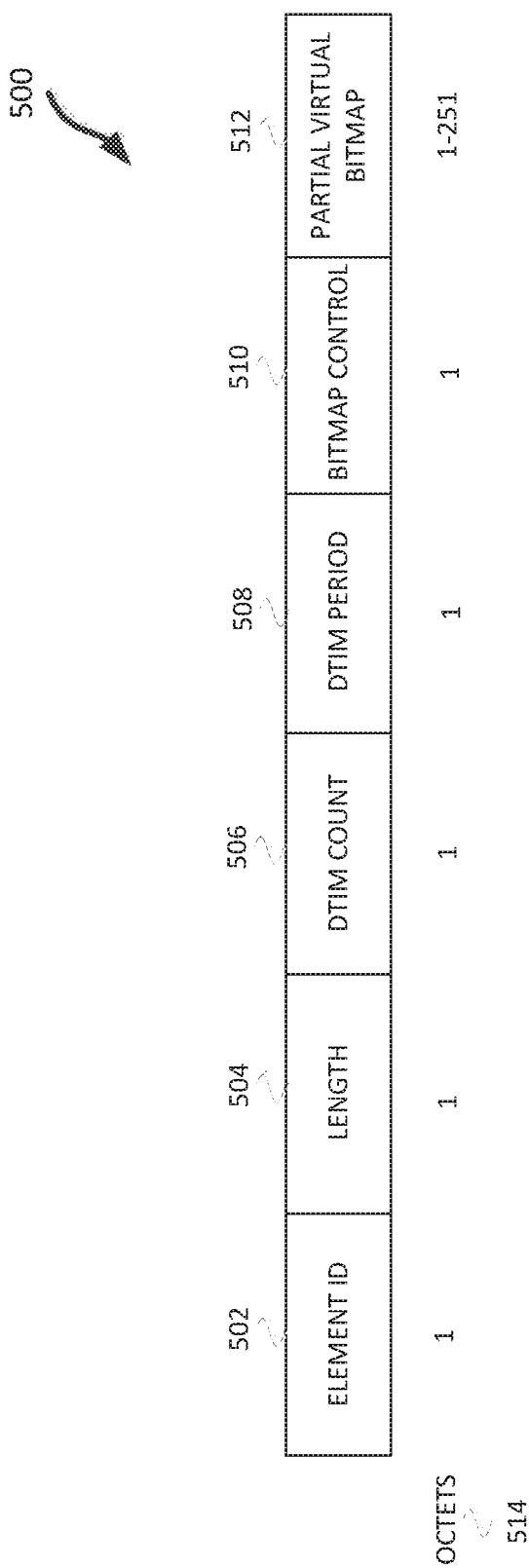
FIG. 5 illustrates a TIM element in accordance with some embodiments.

FIG. 5 illustrates a TIM element 500 in accordance with some embodiments. Illustrated in FIG. 5 is an element ID 502, length 504, dynamic TIM (DTIM) count 506, DTIM period 508, bitmap control 510, and partial virtual bitmap 512. The number of octets 514 of a subfield are indicated below the TIM element 400. The partial virtual bitmap 512 is made of 1 bit for each of the possible 2008 AIDS that may be assigned by the master station 102. Each bit then corresponds to an AID. If the bit is set (e.g., 1 may indicate that the bit is set), then buffered data is present for the station with the corresponding AID. If the bit is not set (e.g., 0 may indicate that the bit is not set), then there is not buffered data for the corresponding station.

The TIM element 400 may include a REID assignment to AIDs for MU-PS polling where each station counts the number of AIDs that have buffered data (e.g., bit equal to 1) in the partial virtual bitmap 512 for AIDs lower than the stations AID. If that station has buffered data, then the RBID assigned to that station is equal to the previously calculated number of stations that have buffered data plus 1.

If the number of assigned RBIDs is higher than a maximum number of RBIDs that can be determined based on a number of subchannels of a bandwidth and a number of spatial streams, then multiple groups of RBIDs can be made. The first group may be all the RBIDs up to the maximum number of RBIDs (which both the station and the master station may know), and then the second group may be a repeat of the first group. With the number of groups continuing until all the RBIDs are account for. The stations transmit on the resource allocation 406 in accordance with the groups where the first group goes first, the second group goes second, etc.

The element ID 502 may be an identification of the TIM element 500. The length 504 may be a length of the TIM element 500. The DTIM period 508 may indicate how frequently DTIMs 500 are transmitted.

Embodiments may have the technical effect that a master station 102 may assign RBIDs dynamically to HEW stations 104 despite there being more AIDs 302 than there are RBIDs 306.

Figure 6:
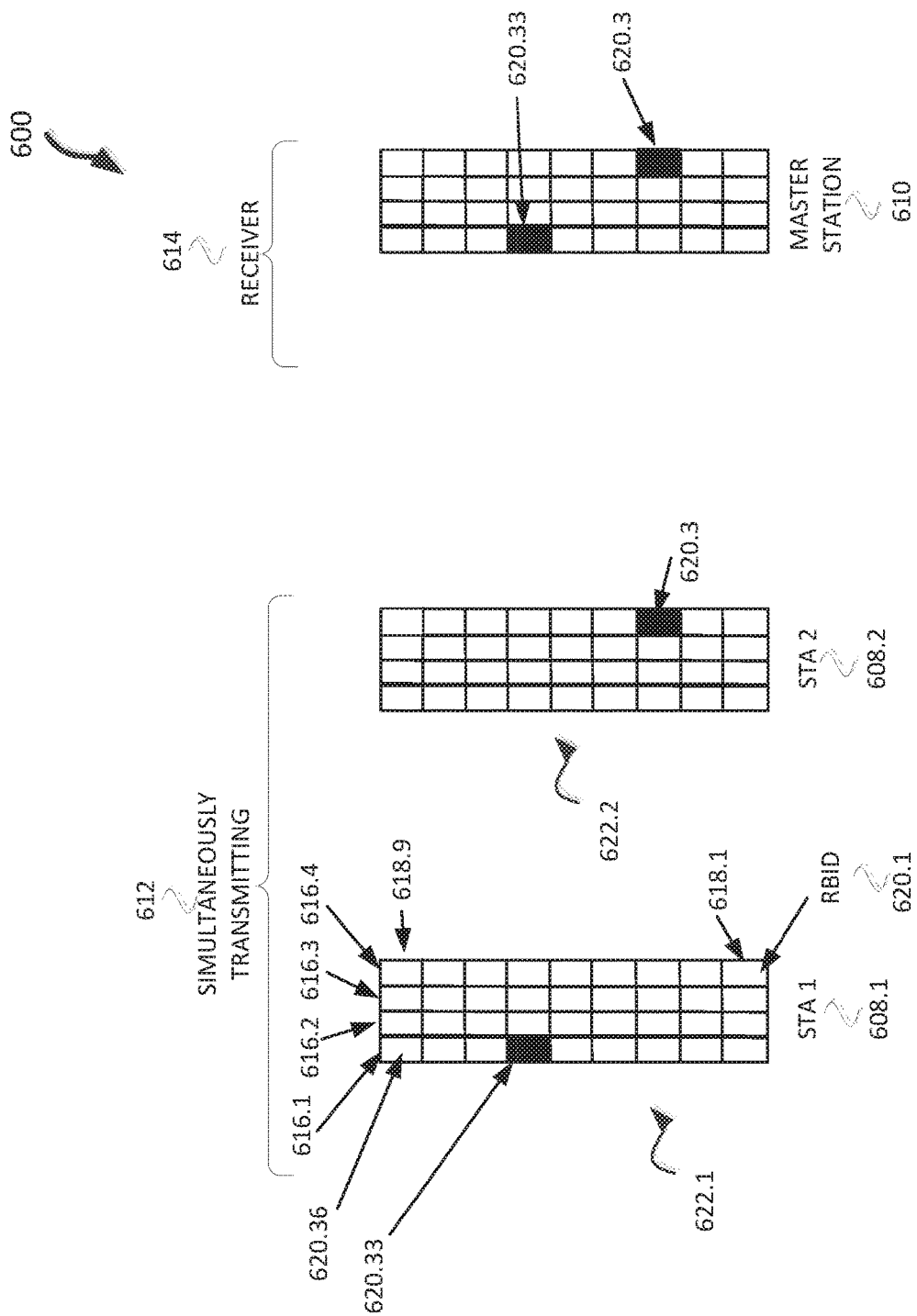
FIG. 6 illustrates an example of stations transmitting PS-Poll to the master station in accordance with some embodiments.

FIG. 6 illustrates an example 600 of stations transmitting PS-Poll to the master station in accordance with some embodiments. Illustrated in FIG. 2 is simultaneous transmission 612 of STA 1 608.1 and STA 2 608.2 that is received by receiver 614 master station 610. STA 1 608.1 and STA 2 608.2 may be HEW stations 104. The master station 610 may be a master station 102 or a HEW station 104.

STA 1 608.1 is transmitting a PS-Poll 622.1 and STA 2 608.2 is transmitting PS-Poll 622.2. STA 1 608.1 is transmitting on resource block identification (RBID) 620.33 and STA 1 208.2 is transmitting on RBID 222.3. STA 1 608.1 and STA 2 608.2 may have determined their respective RBID 620 based on the bitmap 304 and their respective AIDs 302 (see FIG. 3).

The RBIDs 220 may be defined by the master station 102 or a communication standard. As illustrated the RBIDs 220 are being transmitted on a 20 MHz subchannel with four spatial streams. In some embodiments, multiple subchannels may be used or the subchannel may be smaller or larger.

The columns 216.1, 216.2, 216.3, and 216.4 represent different resource blocks which may be spatial streams that may represent the different codes of the P-matrix, which may be a HE-LTF. The rows 218.1 through 218.9 represent the different resource blocks in the frequency domain. For example, as illustrated, RBIDs may be from 220.1 through 220.36. The rows 218 may be 2 MHz each with 26 data carriers. In some embodiments, the size of the resource blocks 218 may be different. For example, the resource blocks may comprise fewer or more data carriers. In some embodiments, the number of spatial streams may be different. For example, there may be fewer or more spatial streams for fewer or more columns 216.

The receiver 214, which is a master station 102, receives the transmission on RBID 220.33 from STA 1 208.1 and the transmission on RBID 220.3 at the same time. The STAs 208 may transmit simultaneously on the same subchannel. Each RBID 220 may be a 1-bit feedback mechanism.

Figure 7:
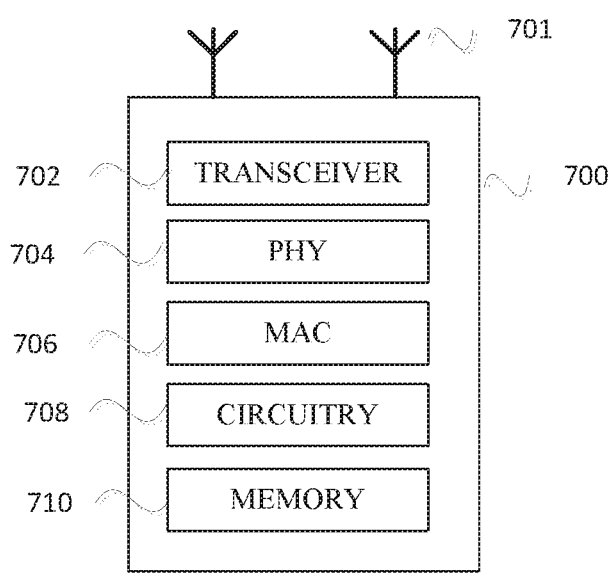
FIG. 7 illustrates a HEW device in accordance with some embodiments.

FIG. 7 illustrates a HEW device 700 in accordance with some embodiments. HEW device 700 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 700 may be suitable for operating as master station 102 (FIG. 1) or a HEW STA 104 (FIG. 1). In accordance with embodiments, HEW device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW compliant layers and may also be compliant with one or more legacy IEEE 802.13 standards. MAC circuitry 706 may be arranged to configure packets such as a physical layer convergence procedure (PLCP) protocol data unit (PPDUs) and arranged to transmit and receive PPDUs, among other things. HEW device 700 may also include circuitry 708 and memory 710 configured to perform the various operations described herein. The circuitry 708 may be coupled to the transceiver 702, which may be coupled to the transmit/receive element 701. While FIG.

7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a contention period to receive control of the medium for the HEW control period and configure an HEW PPDU. In some embodiments, the MAC circuitry 706 may be arranged to contend for the wireless medium based on channel contention settings, a transmitting power level, and a CCA level.

The PHY circuitry 704 may be arranged to transmit the HEW PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may include processing circuitry and/or transceiver circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7.

In some embodiments, the transmit/receive elements 701 may be two or more antennas that may be coupled to the PHY circuitry 704 and arranged for sending and receiving signals including transmission of the HEW packets. The transceiver 702 may transmit and receive data such as HEW PPDU and packets that include an indication that the HEW device 700 should adapt the channel contention settings according to settings included in the packet. The memory 710 may store information for configuring the other circuitry to perform operations for configuring and transmitting HEW packets and performing the various operations to perform one or more of the functions and/or methods described herein and/or in conjunction with FIGS. 1-7.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 700 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of an access point. The apparatus comprising a memory and processing circuitry, the processing circuitry configured to: encode a packet comprising a plurality of bits one bit for each association identification (AID) of a plurality of AIDs, wherein a bit is to be set if the access point is to poll a station of one or more stations corresponding to the AID, wherein each set bit indicates a resource block identification; encode a power save (PS) poll trigger to be transmitted to the one or more stations; and decode one or more responses to the PS poll trigger from the one or more stations, wherein the responses are to be received from the one or more stations in accordance with the corresponding resource block identification.

In Example 2, the subject matter of Example 1 can optionally include where the resource block identification is determined by a number of set bits plus one of the plurality of AIDs that have a lower number than the AID of the corresponding station of the one or more stations.

In Example 3, the subject matter of Examples 1 or 2 can optionally include where a number of the plurality of AIDs is 2008.

In Example 4, the subject matter of Examples 1-3 can optionally include where the wireless apparatus is to poll the station if the wireless apparatus has buffered data to be transmitted to the station.

In Example 5, the subject matter of Examples 1-4 can optionally include where the apparatus is to poll the station to determine if the station has data to be transmitted to the wireless apparatus.

In Example 6, the subject matter of Examples 1-5 can optionally include where the resource block identification identifies a subchannel and spatial stream for the station to use to respond to the PS poll trigger.

In Example 7, the subject matter of Examples 1-6 can optionally include where the subchannel has a bandwidth of one from the following group: 2 Mega-Hertz (MHz), 2.03 MHz, a second bandwidth having exactly 26 data tones, 5 MHz, 10 MHz, and 20 MHz.

In Example 8, the subject matter of Examples 1-7 can optionally include where the processing circuitry is further configured to: encode a multi-user downlink trigger frame comprising a resource allocation for each of the stations of the plurality of stations corresponding to the one or more responses to the PS poll trigger; and encode downlink data in accordance with the multi-user downlink trigger frame and in accordance with orthogonal frequency-division multiple access (OFDMA).

In Example 9, the subject matter of Examples 1-8 can optionally include where the downlink trigger frame is to be transmitted on a primary channel.

In Example 10, the subject matter of Examples 1-9 can optionally include where the packet is one from the following group: a beacon frame, an acknowledgement, a multi-user acknowledgement, a trigger frame, and a management frame.

In Example 11, the subject matter of Examples 1-10 can optionally include where the apparatus and the station are each one from the following group: an Institute of Electrical and Electronic Engineers (IEEE) 802.11ax access point, an IEEE 802.11ax station, an IEEE 802.11ay access point, and an IEEE 802.11ay station.

In Example 12, the subject matter of Examples 1-11 can optionally include where the processing circuitry is further configured to: encode a multi-user acknowledgement to acknowledge each of the one or more responses to the PS poll trigger, wherein the multi-user acknowledgement is to be transmitted on a primary subchannel.

In Example 13, the subject matter of Examples 1-12 can optionally include one or more antennas coupled to the processing circuitry.

In Example 14, the subject matter of Example 13 can optionally include transceiver circuitry coupled to the one or more antenna, wherein the processing circuitry is further configured to: transmit the packet in on a primary subchannel.

Example 15 is a non-transitory computer-readable storage medium that stores instructions for execution by one or more processors. The instructions to configure the one or more processors to cause a wireless apparatus to: encode a packet comprising a plurality of bits one bit for each association identification (AID) of a plurality of AIDs, wherein a bit is to be set if the wireless apparatus is to poll a station of one or more stations corresponding to the AID, wherein each set bit indicates a resource block identification; encode a power save (PS) poll trigger to be transmitted to the one or more stations; and decode one or more responses to the PS poll trigger from the one or more stations, wherein the responses are to be received from the one or more stations in accordance with the corresponding resource block identification.

In Example 16, the subject matter of Example 15 can optionally include where the resource block identification is determined by a number of set bits plus one of the plurality of AIDs that have a lower number than the AID of the corresponding station of the one or more stations.

In Example 17, the subject matter of Examples 15 or 16 can optionally include where the wireless apparatus is to poll the station if the wireless apparatus has buffered data to be transmitted to the station.

In Example 18, the subject matter of Examples 15-17 can optionally include where the instructions to further configure the one or more processors to cause a wireless apparatus to: encode a multi-user downlink trigger frame comprising a resource allocation for each of the stations of the plurality of stations corresponding to the one or more responses to the PS poll trigger; and encode downlink data in accordance with the multi-user downlink trigger frame and in accordance with orthogonal frequency-division multiple access (OFDMA).

Example 19 is a method performed by an access point (AP). The method comprising: encoding a packet comprising a plurality of bits one bit for each association identification (AID) of a plurality of AIDs, wherein a bit is to be set if the wireless apparatus is to poll a station of one or more stations corresponding to the AID, wherein each set bit indicates a resource block identification; encoding a power save (PS) poll trigger to be transmitted to the one or more stations; and decoding one or more responses to the PS poll trigger from the one or more stations, wherein the responses are to be received from the one or more stations in accordance with the corresponding resource block identification.

In Example 20, the subject matter of Example 19 can optionally include where the wireless apparatus is to poll the station if the wireless apparatus has buffered data to be transmitted to the station.

Example 21 is an apparatus of a station comprising a memory and processing circuitry coupled to the memory. The processing circuitry configured to: decode a packet comprising a plurality of bits one bit for each association identification (AID) of a plurality of AIDs; decode a PS poll trigger; and in response to decoding a power save (PS) poll trigger the bit corresponding to the AID of the wireless apparatus being set, determine a resource block identification based on the plurality of bits and encode a response to the PS poll trigger in accordance with the resource block identification.

In Example 22, the subject matter of Example 21 can optionally include where the processing circuitry is further configured to: determine the resource block identification by a number of set bits plus one of the plurality of AIDs that have a lower number than the AID of the wireless apparatus.

In Example 23, the subject matter of Examples 21 or 22 can optionally include where the PS poll trigger is to indicate that a second wireless apparatus has buffered data to transmit to the wireless apparatus.

In Example 24, the subject matter of any of Examples 21-23 can optionally include where the resource block identification identifies a subchannel and spatial stream for the station to use to respond to the PS poll trigger.

In Example 25, the subject matter of any of Examples 21-24 can optionally include one or more antennas coupled to the processing circuitry.

Example 26 is an apparatus of an access point. The apparatus comprising: means for encoding a packet comprising a plurality of bits one bit for each association identification (AID) of a plurality of AIDs, wherein a bit is to be set if the access point is to poll a station of one or more stations corresponding to the AID, wherein each set bit indicates a resource block identification; means for encoding a power save (PS) poll trigger to be transmitted to the one or more stations; and means for decoding one or more responses to the PS poll trigger from the one or more stations, wherein the responses are to be received from the one or more stations in accordance with the corresponding resource block identification.

In Example 27, the subject matter of Example 26 can optionally include where the resource block identification is determined by a number of set bits plus one of the plurality of AIDs that have a lower number than the AID of the corresponding station of the one or more stations.

In Example 28, the subject matter of Examples 26 or 27 can optionally include where a number of the plurality of AIDs is 2008.

In Example 29, the subject matter of any of Examples 26-28 can optionally include where the apparatus is to poll the station if the wireless apparatus has buffered data to be transmitted to the station.

In Example 30, the subject matter of any of Examples 26-29 can optionally include where the apparatus is to poll the station to determine if the station has data to be transmitted to the wireless apparatus.

In Example 31, the subject matter of any of Examples 26-30 can optionally include where the resource block identification identifies a subchannel and spatial stream for the station to use to respond to the PS poll trigger.

In Example 32, the subject matter of any of Examples 26-31 can optionally include where the subchannel has a bandwidth of one from the following group: 2 Mega-Hertz (MHz), 2.03 MHz, a second bandwidth having exactly 26 data tones, 5 MHz, 10 MHz, and 20 MHz.

In Example 33, the subject matter of any of Examples 26-32 can optionally include means for encoding a multi-user downlink trigger frame comprising a resource allocation for each of the stations of the plurality of stations corresponding to the one or more responses to the PS poll trigger; and means for encoding downlink data in accordance with the multi-user downlink trigger frame and in accordance with orthogonal frequency-division multiple access (OFDMA).

In Example 34, the subject matter of Example 33 can optionally include where the downlink trigger frame is to be transmitted on a primary channel.

In Example 35, the subject matter of any of Examples 26-34 can optionally include where the packet is one from the following group: a beacon frame, an acknowledgement, a multi-user acknowledgement, a trigger frame, and a management frame.

In Example 36, the subject matter of any of Examples 26-35 can optionally include where the apparatus and the station are each one from the following group: an Institute of Electrical and Electronic Engineers (IEEE) 802.11ax access point, an IEEE 802.11ax station, an IEEE 802.11ay access point, and an IEEE 802.11ay station.

In Example 37, the subject matter of any of Examples 26-36 can optionally include means for encoding a multi-user acknowledgement to acknowledge each of the one or more responses to the PS poll trigger, wherein the multi-user acknowledgement is to be transmitted on a primary subchannel.

In Example 38, the subject matter of any of Examples 26-37 can optionally include means for receiving and transmitting radio waves.

Example 39 is an apparatus of a station comprising: means for decoding a packet comprising a plurality of bits one bit for each association identification (AID) of a plurality of AIDs; means for decoding a PS poll trigger; and in response to decoding a power save (PS) poll trigger the bit corresponding to the AID of the wireless apparatus being set, means for determining a resource block identification based on the plurality of bits and encode a response to the PS poll trigger in accordance with the resource block identification.

In Example 40, the subject matter of any of Example 39 can optionally include means for determining the resource block identification by a number of set bits plus one of the plurality of AIDs that have a lower number than the AID of the wireless apparatus.

In Example 41, the subject matter of any Examples 39 or 40 can optionally include where the PS poll trigger is to indicate that a second wireless apparatus has buffered data to transmit to the wireless apparatus.

In Example 42, the subject matter of any of Examples 39-41 can optionally include where the resource block identification identifies a subchannel and spatial stream for the station to use to respond to the PS poll trigger.

In Example 43, the subject matter of any of Examples 39-42 can optionally include means for transmitting and receiving radio waves.

Example 44 is a non-transitory computer-readable storage medium that stores instructions for execution by one or more processors. The instructions to configure the one or more processors to cause a station to: decode a packet comprising a plurality of bits one bit for each association identification (AID) a plurality of AIDs; decode a PS poll trigger; and in response to decoding a power save (PS) poll trigger the bit corresponding to the AID of the wireless apparatus being set, determine a resource block identification based on the plurality of bits and encode a response to the PS poll trigger in accordance with the resource block identification.

In Example 45, the subject matter of Example 44 can optionally include where the instructions configure the station to: determine the resource block identification by a number of set bits plus one of the plurality of AIDs that have a lower number than the AID of the wireless apparatus.

In Example 46, the subject matter of Examples 44 or 45 can optionally include where the PS poll trigger is to indicate that a second wireless apparatus has buffered data to transmit to the wireless apparatus.

In Example 47, the subject matter of any of Examples 44-46 can optionally include where the resource block identification identifies a subchannel and spatial stream for the station to use to respond to the PS poll trigger.

Example 48 is a method performed by a station. The method comprising: decoding a packet comprising a plurality of bits one bit for each association identification (AID) of a plurality of AIDs; decoding a PS poll trigger; and in response to decoding a power save (PS) poll trigger the bit corresponding to the AID of the wireless apparatus being set, determining a resource block identification based on the plurality of bits and encode a response to the PS poll trigger in accordance with the resource block identification.

In Example 49, the subject matter of Example 48 can optionally include determining the resource block identification by a number of set bits plus one of the plurality of AIDS that have a lower number than the AID of the wireless apparatus.

In Example 50, the subject matter of Examples 48 or 49 can optionally include where the PS poll trigger is to indicate that a second wireless apparatus has buffered data to transmit to the wireless apparatus.

In Example 51, the subject matter of any of Examples 48-50 can optionally include where the resource block identification identifies a subchannel and spatial stream for the station to use to respond to the PS poll trigger.

The Abstract is provided to comply with 37 CFR. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point, the apparatus comprising a memory and processing circuitry, the processing circuitry configured to:
   encode a packet comprising a plurality of bits, the plurality of bits comprising one bit for each association identification (AID) of a plurality of AIDs, wherein a bit is to be set if the access point is to poll a station of one or more stations corresponding to the AID, wherein each set bit indicates a resource block identification;
   encode a power save (PS) poll trigger to be transmitted to the one or more stations; and
   decode one or more responses to the PS poll trigger from the one or more stations, wherein the responses are to be received from the one or more stations in accordance with the corresponding resource block identification.

2. The apparatus of claim 1, wherein the resource block identification is determined by a number of set bits plus one of the plurality of AIDs that have a lower number than the AID of the corresponding station of the one or more stations.

3. The apparatus of claim 1, wherein a number of the plurality of AIDs is 2008.

4. The apparatus of claim 1, wherein the apparatus is to poll the station if the wireless apparatus has buffered data to be transmitted to the station.

5. The apparatus of claim 1, wherein the apparatus is to poll the station to determine if the station has data to be transmitted to the apparatus.

6. The apparatus of claim 1, wherein the resource block identification identifies a subchannel and spatial stream for the station to use to respond to the PS poll trigger.

7. The apparatus of claim 1, wherein the subchannel has a bandwidth of one from the following group: 2 Mega-Hertz (MHz), 2.03 MHz, a second bandwidth having exactly 26 data tones, 5 MHz, 10 MHz, and 20 MHz.

8. The apparatus of claim 1, wherein the processing circuitry is further configured to:
   encode a multi-user downlink trigger frame comprising a resource allocation for each of the stations of the plurality of stations corresponding to the one or more responses to the PS poll trigger; and
   encode downlink data in accordance with the multi-user downlink trigger frame and in accordance with orthogonal frequency-division multiple access (OFDMA).

9. The apparatus of claim 8, wherein the downlink trigger frame is to be transmitted on a primary channel.

10. The apparatus of claim 1, wherein the packet is one from the following group: a beacon frame, an acknowledgement, a multi-user acknowledgement, a trigger frame, and a management frame.

11. The apparatus of claim 1, wherein the apparatus and the station are each one from the following group: an Institute of Electrical and Electronic Engineers (IEEE) 802.11ax access point, an IEEE 802.11ax station, an IEEE 802.11ay access point, and an IEEE 802.11ay station.

12. The apparatus of claim 1, wherein the processing circuitry is further configured to:
   encode a multi-user acknowledgement to acknowledge each of the one or more responses to the PS poll trigger, wherein the multi-user acknowledgement is to be transmitted on a primary subchannel.

13. The apparatus of claim 1, further comprising one or more antennas coupled to the processing circuitry.

14. The apparatus of claim 13, wherein the processing circuitry is further configured to:
   transmit the packet in on a primary subchannel.

15. A non-transitory computer-readable storage medium that stores instructions for execution by one or more processors, the instructions to configure the one or more processors to cause a wireless apparatus to:
   encode a packet comprising a plurality of bits, the plurality of bits comprising one bit for each association identification (AID) of a plurality of AIDs, wherein a bit is to be set if the wireless apparatus is to poll a station of one or more stations corresponding to the AID, wherein each set bit indicates a resource block identification;
   encode a power save (PS) poll trigger to be transmitted to the one or more stations; and
   decode one or more responses to the PS poll trigger from the one or more stations, wherein the responses are to be received from the one or more stations in accordance with the corresponding resource block identification.

16. The non-transitory computer-readable storage medium of claim 15, wherein the resource block identification is determined by a number of set bits plus one of the plurality of AIDs that have a lower number than the AID of the corresponding station of the one or more stations.

17. The non-transitory computer-readable storage medium of claim 15, wherein the wireless apparatus is to poll the station if the wireless apparatus has buffered data to be transmitted to the station.

18. The non-transitory computer-readable storage medium of claim 15, wherein the instructions to further configure the one or more processors to cause a wireless apparatus to:
   encode a multi-user downlink trigger frame comprising a resource allocation for each of the stations of the plurality of stations corresponding to the one or more responses to the PS poll trigger; and
   encode downlink data in accordance with the multi-user downlink trigger frame and in accordance with orthogonal frequency-division multiple access (OFDMA).

19. A method performed by an access point (AP), the method comprising:
   encoding a packet comprising a plurality of bits, the plurality of bits comprising one bit for each association identification (AID) of a plurality of AIDs, wherein a bit is to be set if the wireless apparatus is to poll a station of one or more stations corresponding to the AID, wherein each set bit indicates a resource block identification;
   encoding a power save (PS) poll trigger to be transmitted to the one or more stations; and
   decoding one or more responses to the PS poll trigger from the one or more stations, wherein the responses are to be received from the one or more stations in accordance with the corresponding resource block identification.

20. The method of claim 19, wherein the wireless apparatus is to poll the station if the wireless apparatus has buffered data to be transmitted to the station.

21. An apparatus of a station comprising a memory and processing circuitry coupled to the memory, the processing circuitry configured to:
  decode a packet comprising a plurality of bits, the plurality of bits comprising one bit for each association identification (AID) of a plurality of AIDs;
  decode a PS poll trigger; and
  in response to decoding a power save (PS) poll trigger the bit corresponding to the AID of the wireless apparatus being set, determine a resource block identification based on the plurality of bits and encode a response to the PS poll trigger in accordance with the resource block identification.

22. The apparatus of claim 21, wherein the processing circuitry is further configured to:
  determine the resource block identification by a number of set bits plus one of the plurality of AIDs that have a lower number than the AID of the wireless apparatus.

23. The apparatus of claim 21, wherein the PS poll trigger is to indicate that a second wireless apparatus has buffered data to transmit to the wireless apparatus.

24. The wireless apparatus of claim 21, wherein the resource block identification identifies a subchannel and spatial stream for the station to use to respond to the PS poll trigger.

25. The wireless apparatus of claim 21, further comprising one or more antennas coupled to the processing circuitry.

* * * * *